(12) United States Patent
Amend (10) Patent No.: US 10,716,317 B2
(45) Date of Patent: Jul. 21, 2020

(54) PARTIAL COATING OF FROZEN CONFECTION

(71) Applicant: NESTEC S.A., Vevey (CH)

(72) Inventor: Thomas Aloisius Valentinus Amend, Bakersfield, CA (US)

(73) Assignee: Societe des Produits Nestle S.A., Vevey (CH)

( * ) Notice: Subject to any disclaimer, the term of this patent is extended or adjusted under 35 U.S.C. 154(b) by 75 days.

(21) Appl. No.: 15/749,532

(22) PCT Filed: Aug. 4, 2016

(86) PCT No.: PCT/EP2016/068631
§ 371 (c)(1),
(2) Date: Feb. 1, 2018

(87) PCT Pub. No.: WO2017/025422
PCT Pub. Date: Feb. 16, 2017

(65) Prior Publication Data
US 2018/0213816 A1    Aug. 2, 2018

Related U.S. Application Data

(60) Provisional application No. 62/202,269, filed on Aug. 7, 2015.

(51) Int. Cl.
*A23G 3/22*    (2006.01)
*A23G 3/34*    (2006.01)
(Continued)

(52) U.S. Cl.
CPC .............. *A23G 3/22* (2013.01); *A23G 3/0091* (2013.01); *A23G 3/0093* (2013.01); *A23G 3/24* (2013.01);
(Continued)

(58) Field of Classification Search
CPC . A23G 9/245; A23G 3/22; A23G 3/26; A23G 3/28; B05C 3/20
See application file for complete search history.

(56) References Cited

U.S. PATENT DOCUMENTS 3,632,356 A    1/1972 Silverstein et al.
3,958,018 A    5/1976 Tay
(Continued)

FOREIGN PATENT DOCUMENTS

WO    2013092503    6/2013

*Primary Examiner* — Binu Thomas
(74) *Attorney, Agent, or Firm* — K&L Gates LLP (57) ABSTRACT

The present invention relates to an application assembly for applying coating onto confectionary products comprising a housing (5) comprising a product coating void (6) for receiving the confectionery product (9) to be coated, at least one receptacle (8), the receptacle being adapted to receive coating material and comprising a supply hole or holes (11) through which coating material may flow from the housing (5) and into the coating void (6) where it becomes transferred onto the product, and wherein each receptacle comprises one or more applicator members (10) to transfer 16 coating material onto the confectionery product and wherein the supply hole or holes (11) are formed within said receptacles, and wherein the one or more applicator member comprises a cavity (14) to allow accumulated coating material to be collected and stored when a product remains static in the product void. The invention also relates to a method for applying a partial coating to a confection products.

11 Claims, 5 Drawing Sheets

(51) Int. Cl.
*A23G 3/24* (2006.01)
*A23G 9/24* (2006.01)
*B05C 3/20* (2006.01)
*B05C 3/09* (2006.01)

(52) U.S. Cl.
CPC ................ *A23G 9/245* (2013.01); *B05C 3/09* (2013.01); *B05C 3/20* (2013.01)

(56) References Cited

U.S. PATENT DOCUMENTS

| | | | | |
|---|---|---|---|---|
| 4,189,289 | A * | 2/1980 | Getman | A23G 9/245 425/100 |
| 6,251,455 | B1 | 6/2001 | Thomas | |
| 7,005,151 | B1 * | 2/2006 | Fessler | A23G 9/245 118/29 |
| 2011/0086144 | A1 * | 4/2011 | Arampongpun | A23G 9/245 118/13 |
| 2012/0308731 | A1 * | 12/2012 | Simpson | B05C 3/20 118/300 |

* cited by examiner

PARTIAL COATING OF FROZEN CONFECTION

CROSS REFERENCE TO RELATED APPLICATIONS

The present application is a National Stage of International Application No. PCT/EP2016/068631, filed on Aug. 4, 2016, which claims priority to U.S. Provisional Patent Application No. 62/202,269, filed on Aug. 7, 2015, the entire contents of which are being incorporated herein by reference.

FIELD OF THE INVENTION

The present invention relates to an apparatus and a process for applying edible decorative elements onto products such as frozen confection. In particular the invention relates to applying partial coating onto frozen confection.

BACKGROUND OF THE INVENTION

There is a desire in the food industry to create visually attractive products to provide the best possible experience for the consumer. One way to enhance the product appearance is by applying patterns onto the surface of the product, made from edible materials such as coatings, chocolate or other edible liquids.

In ice cream manufacturing, it is common practice to enrobe products, such as ice cream products on a stick, using chocolate or other coating materials. These products are typically preferred by consumers who can enjoy ice cream and chocolate simultaneously.

Typically these products get fully enrobed by dipping them into a bath of liquid chocolate, resulting in an attractive coverture. There are also products that are not fully enrobed but covered only partly such as half covered, by dipping them only half way into the liquid chocolate. Reasons to cover a product only partly may be economical or nutritional. Such products then have covered part and an uncovered part, with the border between covered and uncovered part typically being a straight line.

Artisanal ice lollies have long been partially coated by dipping the product into the coating in a tilted orientation. Examples of such products are available from pop-bar™. As a result, the coating covers the product with the borderline between coated and uncoated portions running diagonally relative to the product axis (axis of the stick). Although this may be an attractive solution, this procedure cannot generate a borderline other than straight.

US2002/0068119 A1 and WO 02/082918 describe systems for applying coating onto surfaces of frozen desserts. Application is done by projection rather than by dipping and the procedure generates lines rather than full coating. It is therefore not suitable to cover one part of the product in a closed layer and leave the other part uncovered with a not-straight borderline.

EP1161880A1 discloses a method of applying printing fluids such as chocolate onto objects such as biscuits. The fluid is printed by projecting numerous tiny droplets in a way to create a desired pattern. While this technology can cover surfaces of frozen confections in various designs, it requires a complex set up of printing heads to achieve a continuous coverage around the product.

EP 2793602 discloses a method of decorating a frozen confection by applying a liquid coating material to the surface of the confectionery product and allowing the coating material to flow down along the product. This invention does not provide a solution to partial coating a confectionery product with an improved definition of the coating border of a half or partly dipped product.

There is an interest among ice cream manufacturers to provide products having an attractive look to increase the appeal for the consumer. It is therefore desirable to overcome the limitations in design imposed by classical partial dipping and to enhance the visual appearance of ice cream products which are half dipped. Further, there is also a need to provide such decorations to a high level of accuracy. There is also a need for products having a good nutritional profile obtained by reducing the amount of the coating material which is usually high in fat.

SUMMARY OF THE INVENTION

It has surprisingly been found that it is possible to apply a partial coating onto a confectionary product which has a well-defined borderline between the coated and uncoated part of the product which is not straight and which can have a decorative shape.

Accordingly, the present invention relates to an application assembly for applying coating onto confectionary product comprising:
a housing comprising:
a product coating void for receiving the confectionery product to be coated,
at least one receptacle, the receptacles being adapted to receive coating material and comprising supply hole or holes through which coating material may flow from the receptacles and into the coating void where it becomes transferred onto the product, and
wherein each receptacle comprises one or more applicator members to transfer the coating material onto the confectionery product and wherein the supply hole or holes are formed within said receptacles, and
wherein the one or more applicator member comprises a cavity to allow accumulated coating material to be collected and stored when a product remains static in the product void.

In a second aspect, the invention relates to a method for applying a partial coating to a confection products comprising
providing a confection product,
providing an application assembly according to any of the preceding claims,
supplying a coating material to the coating application assembly
inserting and retracting the confection product or products into the product coating void, wherein
the coating material is flowing from the housing through the supply hole or holes and forms a layer of coating material on the surface of the application members (10), which is at least as thick as to bridge the space between the surface of the application members (10) and the surface of the product being coated.

It has been found that coating material accumulates during the coating process in the prior art coating applicators. This may result in blurred and less well defined coatings. It has also been found that the accumulation in particular takes place when the product is static in a product is static in a product void. This is for example the case when the product movements are shifted between a downwards and upwards movement. The present invention provides a solution to this problem.

In general, the various aspects of the invention may be combined and coupled in any way possible within the scope of the invention. These and other aspects, features and/or advantages of the invention will be apparent from and elucidated with reference to the embodiments described hereinafter.

DETAILED DESCRIPTION OF THE INVENTION

Coating Material:

An aspect of the present invention relates to a method of applying a coating material to a confectionery product.

In the context of the present invention, the coating material is in a liquid state when applied to the surface of the confectionery product, but the coating material must be able to solidify after coating. Thus, the coating material may be any material which is edible and which can change between a solid form and a liquid form.

In an embodiment of the present invention, the coating material is chocolate, jelly, fruit sauce preparations, compound coatings or a combination thereof. The term "compound coating" refers to a coating material based on fats other than cocoa butter, including milk fat and fats such as coconut oil, palm kernel oil soybean oil or a blend of such oils. The coating material may for example be a light milk chocolate compound coating or a dark chocolate compound coating as described in Marshall et al, "Ice Cream", 6. Ed. 2003, Kluwer Academic/PlenumPublishers, page 288. The light milk chocolate compound coating comprises 6% natural process cocoa, 28.5% sugar, 55% lauric fat, 10% nonfat dry milk, 0.5% lecithin, 0.03% vanillin, while the dark chocolate compound coating comprises 10% Dutch process cocoa, 33% sugar, 56.5% lauric fat, 0.5% lecithin, 0.03% vanillin. The fat added to the compound coatings is palm kernel oil or coconut oil.

The term "liquid" will in the context of the present invention relate to materials having a fluidity such that the material can flow down along a product by gravitation when applied. The flow properties of the coating material when being applied to at least a part of the surface of the confectionery product may be measurerable and expressed in the two values; plastic viscosity and yield value. If a coating material is too thick and too viscous, the flowing of the coating material down along the product will be insufficient. A coating material that is too thin, on the other hand, will lead the coating material flowing too fast down along the product, such that a thin coating layer is made, which have the possibilities of breaking. A coating material with the right degree of viscosity and yield value will flow evenly down the external surface of a product.

For optimum flow properties, the coating material has a plastic viscosity from about 5 to 300 centipoise, preferably from 8 to 280 centipoise, more preferably from 10 to 250 centipoise, such as from 15 to 230 centipoise, even more preferably from 20 to 200 centipoise, such as from 30 to 190, for example from 40 to 180, preferably from 50 to 170, such as from 60 to 150. The viscosity of the liquid coating material differs depending on which coating material is used In an embodiment of the invention, a liquid fat based chocolate compound is used as coating material, which has a viscosity of 60-150 centipoise.

In an embodiment of the invention, the yield value of the coating material is from about 1 to 40 dynes/cm$^2$, preferably from 5 to 25 dynes/cm$^2$.

The term "yield value" refers to the shear stress required to initiate flow of a coating material and relates to the coating or decorating characteristics, the thickness of the coating layer and how quickly a coating material firms up, i.e. becomes solid.

The term "plastic viscosity" or simply "viscosity" is a function of the shear strees required to maintain constant flow. This parameter determines how well the coating material will flow.

Flow properties having the right yield value and viscosity will allow the coating material to flow down along the external surface of the confectionery product in a desirable speed after being applied. Viscosity and yield value can be calculated from multiple torque readings taken with a Brookfield RV viscometer with SC4-28 spindle, using modified Casson equation for chocolate viscometry.

A solid coating material will become liquid by heating the material above its melting point. When heating above its melting point, the coating material becomes liquid, and the coating material becomes solid again by cooling the coating material after applied. In some embodiments a cooling process is not explicitly needed, but the coating material is cooled, just by leaving the coating material on the product in environments cool enough for the coating material to solidify.

If for example a coating material is in a solid form at room temperature it may be heated such that it is melted into a liquid phase. A coating material typically used in the field of coating frozen confections is a compound coating, i.e. a fat based chocolate compound coating, with the main ingredients being a fat such as coconut oil, palm oil, cocoa powder and sugar. Real chocolate is another example of a coating material which is liquid at high temperature, temperatures above about 35 C° C., and solid at temperatures below about 30° C. The exact temperatures for a chocolate to be liquid/solid is however depending on the composition of the chocolate. At temperatures between 28 and 32° C. (depending on the composition) a typical coating material is semi solid. Thus, when heating chocolate, it will change from a solid phase to a liquid phase. However, the solid/liquid state of a chocolate depend of which type of chocolate is used, for example dark chocolate, milk chocolate or white chocolate.

In a preferred embodiment of the invention, the coating material is chocolate.

The chocolate may be chocolate according to accepted regulations or it may be a fat containing confectionery compound material comprising sugar, milk derived components, and fat and solids from vegetable or cocoa sources in differing proportions having a moisture content less than about 10 percent, preferably less than about 5 percent by weight. The fat containing material may be a chocolate substitute containing direct cocoa butter replacements, stearines, coconut oil, palm oil, butter, or any mixture thereof, nut pastes such as peanut butter and fat; praline; confectioner's coatings used for covering cakes usually comprising chocolate analogues with cocoa butter replaced by a less expensive non-tempering fat; or a mixture of non-cocoa butter fats, sugar and milk sold by Nestlé.

Different types of chocolate as a coating material may be used, for example milk chocolate, dark chocolate, white chocolate, or combinations thereof.

In an embodiment of the invention a part of the chocolate is substituted with a fat component.

In an embodiment of the invention the coating material is a compound coating.

A compound coating is a fat based coating as usually used and well known for the skilled person producing chocolate coated stick products. Examples can be found in Marshall, Goff, Hartel: Ice Cream, Sixth Ed., 2003, Kluwer Academic/PlenumPublishers, page 288.

In another preferred embodiment of the invention, a fruit sauce preparation is the coating material.

Examples of fruit sauce preparations may be selected from the group of sauces made from, strawberry, raspberry, blueberry, orange, lemon, mango, blackcurrant, pineapple, etc. Preparations will become viscous when in contact with the surface of the frozen confection and will freeze to a semisolid or solid material due to extraction of heat by the frozen confection.

In still another embodiment of the invention the coating material is a jelly.

In the context of the present invention, the term "jelly" relates to a coating material which is chewy and firm when in a solid phase.

One type of jelly is liquid at high temperatures, but solid a lower temperatures. The temperature at which the jelly is liquid depends on the type of jelly system. The jelly is then liquid when applied to the confectionery product but after cooling the jelly becomes solid.

In another type of jelly, the jelly is liquid at lower temperature, such as room temperature, and solidifies upon contact with a gelling agent. An example of such a gelling agent is alginate which gellifies when in contact with calcium.

In general, a jelly is produced on basis of a cooked mass comprising water, sweetening agent (sugars and/or sugar alcohols), colours (optionally), flavours, and texture giving agents. The cooked mass may be subject to various treatments.

The texture giving agent used in jellies may also be defined by the following terms; "texturizing agents", and "gelling agents". These terms may be used interchangeably. In a jelly, the texture giving agent is defined as compounds with the capability of modulating the texture of the product without contributing a significant increase in energy content. As discussed above, the jellies will in a solid phase be firm and chewy. In other words, the structure may be defined as elastic or gelled. It is the texture giving agent in the jelly which is responsible for the elastic property of a jelly.

Examples of texture giving agents include gelatine, pectin, starch as e.g. natural and/or modified starch, carrageenan, gum Arabic, alginate, gellan gum, agar-agar (identical to agar), etc.

Another characteristic of a jelly is that it is a solid coating material with a three dimensional network structure formed in connection with the gelling/boiling procedure resulting in products with elastic properties. The three dimensional network is normally conferred by addition of texture giving agents prior to boiling of the mass. In fact, the coating material is a liquid and will remain in a liquid phase even when cooling if no texture giving agent is present.

The structure of the jelly depends on how much texture giving agent is present in the coating material. For example, a jelly coating material with a low amount of texture giving agent, but a high amount of water will result in a coating material which is more "jelly like", and more fragile to rupture, while a jelly having a high content of texture giving agent will have a more hard or gummy like consistence like, a vine gum or a jelly bean.

Different flavours may be given to a jelly, for example different fruit flavours, liquorice extract, anise and menthol.

Thus, in an embodiment of the invention, the solidifying of the coating material is by cooling, gelling or drying or a combination thereof.

DETAILED DESCRIPTION

Unless defined otherwise, the terms used herein have the meaning as commonly understood by one of ordinary skill in the art of manufacturing of frozen confectionery. Descriptions and definitions of various terms and techniques as commonly used in frozen confection manufacturing can be found in Ice Cream, 7$^{th}$ Edition, H. Douglas Goff, Richard W. Hartel (2013), Springer Science+Business Media.

Preferred confectionery product to be coated in accordance with the present invention is frozen confection. In particular frozen confection on a stick. These products can be moulded sticks or extruded sticks. They can be either made from water ice, sorbet, sherbet milk ice or other materials used in the manufacture of such stick products. However, other edible products that can be partially coated, such as bisquit rolls or savory ambient products, are also inside the scope of this invention.

The products can be partly or fully coated by any type of the above-described coating prior to applying the partial coating according to our invention. The coating used in the present invention is preferably as described above.

The application assembly according to the present invention is applicable in an industrial coating environment such as during industrial manufacturing of moulded ice confectionery products, and may comprise a supply system for coating material.

Figure 1:
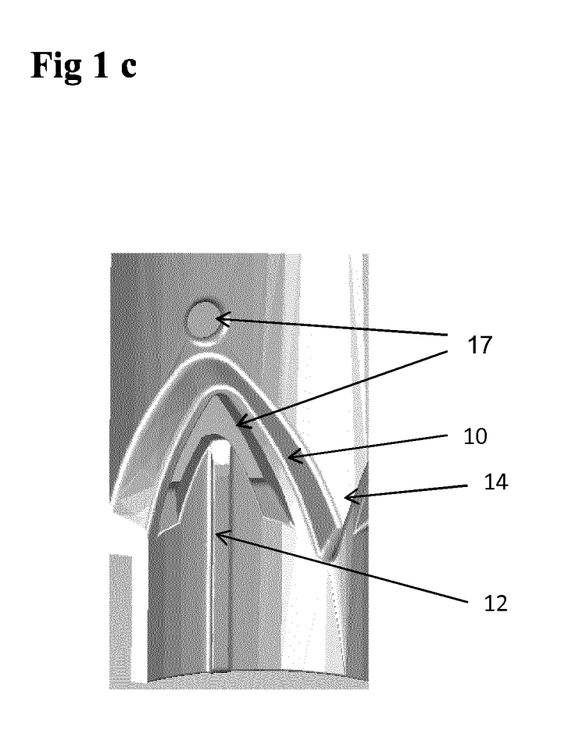
FIG. 1a schematically illustrates the set-up of a coating assembly according to the invention.
FIG. 1b shows a cross sectional view the coating application assembly.
FIG. 1c shows a perspective view of one application member from the receptacle
Figure 1A:
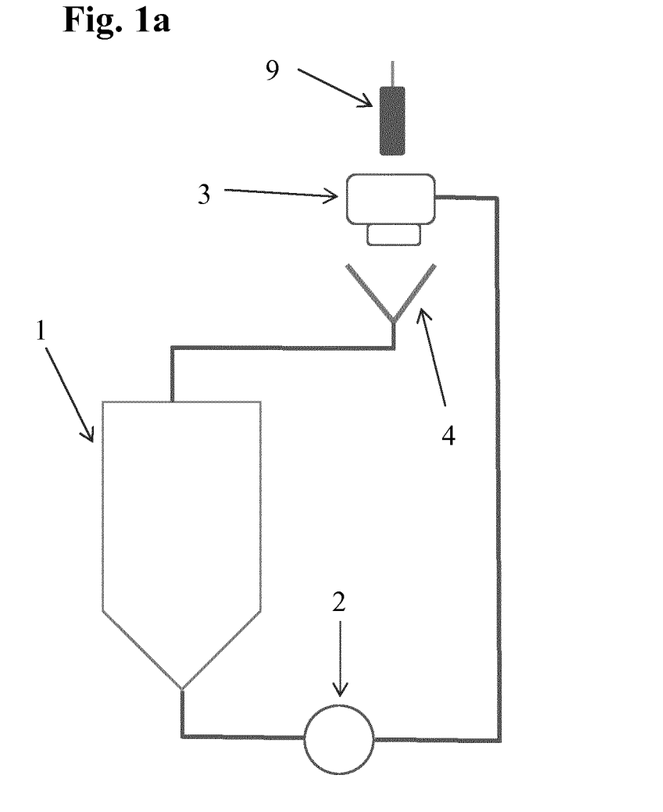

A coating supply system as shown in FIG. 1a may be used for the present invention. The coating supply system consists of a tank (1) holding the coating material, a pump (2) that pushes the coating material to the application assembly (3) into which the product (9) is dipped, and a hopper (4) to collect overflow coating material from the application assembly and return it to the tank (1).

While partially dipping a product into a coating bath results in a generally horizontal borderline, the present invention allows creation of more attractive borderline patterns such as waves.

Conventional dipping operation comprises lowering the product into a coating bath, having a horizontal surface. According to the present invention, a vertical layer of coating material is created, which is flowing downward and is permanently renewed, hence a stable vertical layer of coating material is created. The upper edge of said coating layer is of a designed shape. The surface of the product is, in a vertical up/down movement, brought in contact with this vertical coating layer, whereby it's surface becomes coated. The designed shape of the upper edge of the coating layer is transferred to the coating on the product surface.

Figure 1B:
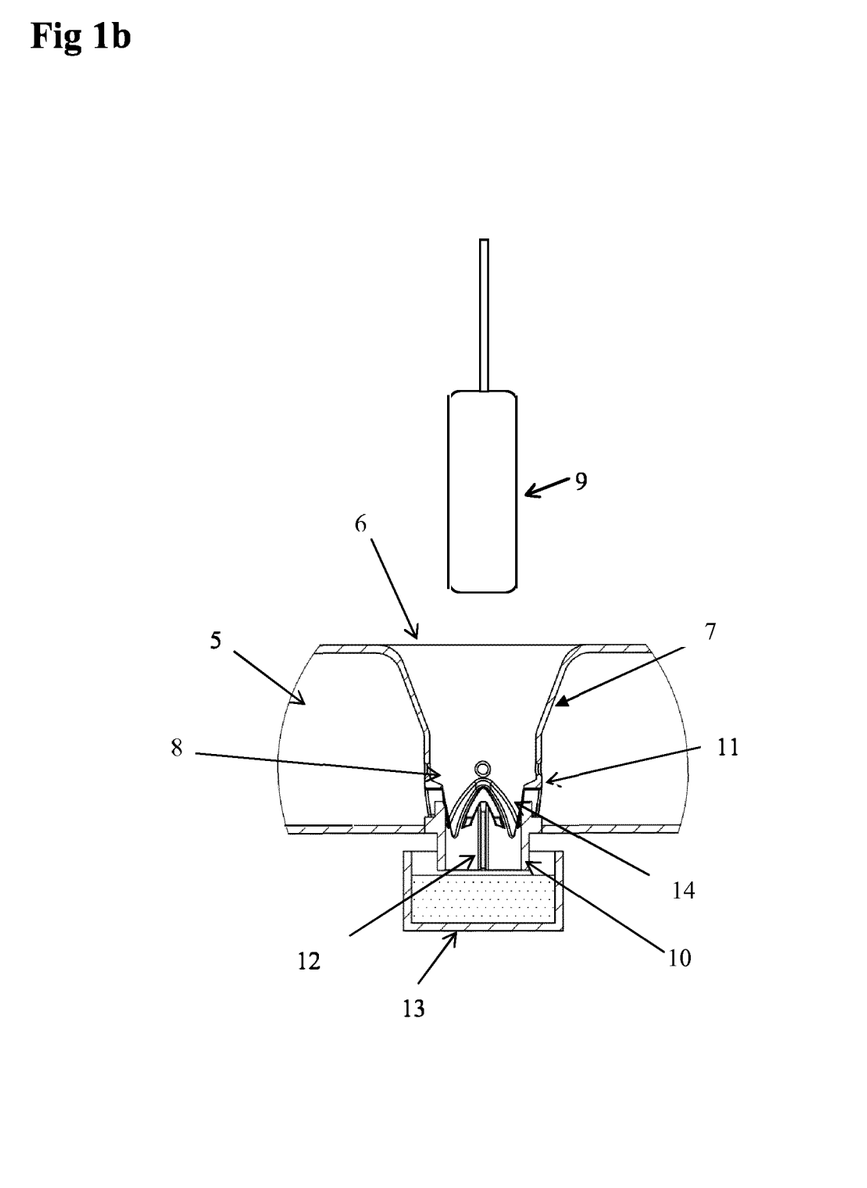

The coating application assembly comprises a housing (5), an example of which is shown in FIG. 1b. The coating material is continuously fed into the housing during operation. The housing defines a product coating void (6) and comprises a receptacle (8). The product void (6) may be defined by walls of the housing and the receptacles. The receptacle reflects the overall shape of the product to be coated. In the case where the product has a cylindrical shape, the receptacle is cylindrical. The receptacle is preferably open at the bottom.

The product (9), e.g. suspended by its stick, is inserted into the receptacle (8), preferably with an inlet funnel (7) which is located above the receptacle and which serves for centering and guiding the product. The product then moves downward into the receptacle (8), passing by the application members (10) to the desired depth. The depth of insertion determines how much of the product surface becomes covered with the coating material. E.g. dipping half of the product into the receptacle will result in half of the product becoming coated. The depth of the insertion can be freely selected according to the desired coating effect.

Preferably, the application assembly has a coating reservoir (13) provided beneath the receptacle (8) for coating of the end of the product inserted into the product coating void.

The coating is applied to the product surface in the receptacle (8). The receptacle (8) can hold one or several application members (10) such as shown in FIGS. 1b and 1c. Preferably there are 1 to 10 of such application members, depending on the desired design, more preferably 3 to 6 and most preferably 4 to 5 of them located in a single receptacle. The application members can be in touch with each other or may not touch, leaving a gap between them. Application members of various sizes and shapes can be combined in one receptacle body.

The applicator member (10) is protruding towards the product coating void from the inner surface of the receptacle, preferably 1 to 15 mm.

These application members (10) advantageously have a protruding edge (18) to guide the flow of coating material and create the borderline between coated and uncoated portions of the surface of the product. The application members protruding edge (18) protrudes towards the inner void of the receptacle (8). The protruding edge (18) has a shape that determines the design of the coating on the product. It can be a triangular shape with concave or convex sides, tilted to a side or be of a rectangular shape or combinations thereof.

It has been found that the coating application is improved when the application member has a surface facing towards the product coating void which is being oriented parallel to the surface of the product part to be coated when inserted in the product coating void.

The application assembly may comprise a plurality of application members which may be are touching each other or exhibiting a gap between each other. When several applicator members are used, the application members in the different receptacle may be identical to each other or being of different sizes and shapes. They may comprise one or more openings of various shapes sectioning the wall of the receptacle.

The application members optionally hold spacer members (12) as shown in FIGS. 1b and 1c, which protrude from the surface of the application members towards the inner void of the receptacle. They have a thickness adapted to bridge a large part of the space between the surface of the application member and the surface of the product, aiming to center the product in the middle of the receptacle void and with a thickness ranging from 0.2 to 5 mm and a width of between 0.5 and 10 mm and a vertical length of between 1 mm and a length corresponding to the height of the application member.

The receptacle body and the application members comprises opening (11) and (17) respectively, as shown in FIG. 1b and 1c, allowing coating fluid from the housing (5) to flow into the inner void of the receptacle and to cover the application members. It is also possible to operate the device by using holes (11) only in the receptacle (8), located above the application members. It is further possible to use only holes or slits (17) located in the application members (10), which are positioned in a way as to generate the desired design of coating pattern. However, combining holes in the receptacle body as well as in the application members result in the most effective coating process.

The coating fluid flowing from the holes creates a permanent coverage of the application members with coating material. The shape of the coating layer created on the application members corresponds to the coating shape transferred onto the product. The openings can be holes of a diameter between 1 mm and 10 mm or slits with a length of 3 mm to 30 mm and a width between 0.5 and 10 mm. Any other shape is possible as well.

Figure 2:
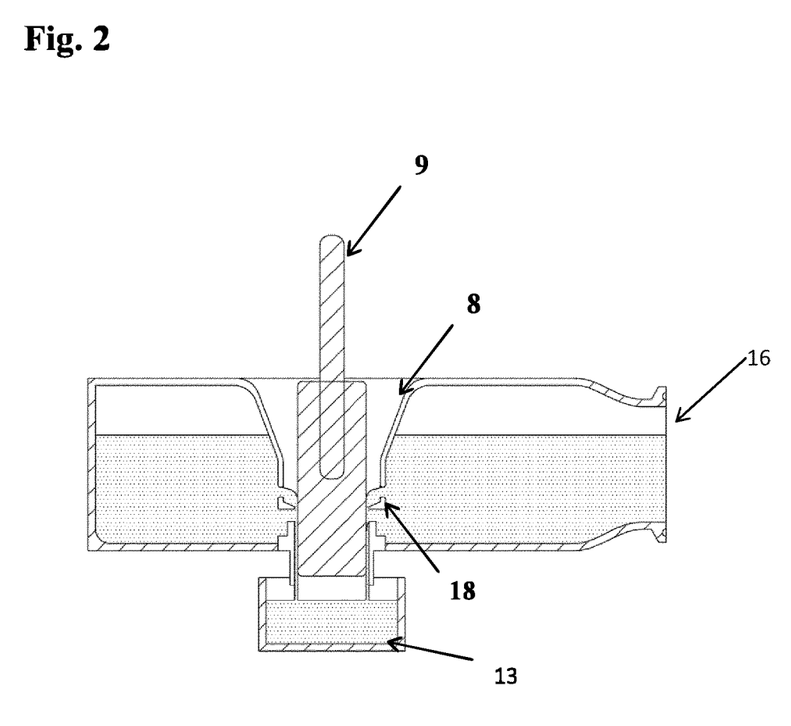
FIG. 2 schematically illustrates the application of coating fluid during insertion of a product in a cross sectional view. Space members are not depicted for clarity.

FIG. 2 shows a cross section of a coating application assembly for coating of one product. Coating material is constantly supplied into the housing during operation through the inlet (16). Several products can be treated at the same time by arranging multiple receptacles in one housing side-by-side.

During operation, coating liquid flows through said openings in the receptacle and forms a layer of liquid covering the application members. The thickness of the layer is at least such that it bridges the space between the application members and the product surface. The appropriate space between the application members and the product surface that can be bridged depends on the amount of coating liquid flowing through the holes and the viscosity of the liquid. It ranges between 0.2 mm to 5 mm, more preferably between 1 and 4 mm, most preferably between 2 mm and 3 mm.

During dipping of the product into the receptacle, the product surface gets coated. The dipping process during industrial operation is a rapid process which typically takes less than a second. If the dipping is done slowly, i.e. the product remains in it's lowest position inside the receptacle for excessive time, coating material streaming into the receptacle will accumulate above the application members, levelling the designed wave shapes. A fast and steady dipping process, as is typically found during industrial manufacturing of frozen desserts, is therefore surprisingly helpful in consistently creating the desired pattern.

The events occurring during the dipping step are further discussed: To achieve a coating fully covering the intended parts of the product, the flow of coating material through the holes needs to be sufficiently strong. Too low a flow would leave uncoated gaps on the product. While a minimum flow speed is needed for good coverage, this minimum continuous flow causes an accumulation of coating material when the product is in its lowest position. This is due to the product largely obstructing the downwards flow of the coating while being inserted into the receptacle. The coating preferably accumulates in the valleys between the wave spikes, i.e. in the space or cavity defined by the shape of the edge of the application members and the space available between the product surface and the receptacle. A preferred example of such a design is shown in FIG. 1c. A space sufficiently large will allow accumulation of sufficient of the coating in those valleys during the brief rest period of the product without markedly affecting the design on the product. Reducing or eliminating that volume by reducing the thickness of the application members or taking them out entirely will result in the desired design being largely destroyed.

During the dipping operation, a half ball shaped or conical end of a product usually becomes fully coated due to coating fluid running down from the sides and covering the tip. However, if the end of a product is flat, this horizontally oriented area may not become fully coated. To achieve a full coating of such products, a bottom coating trough, coating reservoir (13), is installed beneath the receptacle (8). An example of the coating reservoir (13) positioning is shown in FIG. 1b.

The end of the product, when inserted into the receptacle, plunges into the bottom coating reservoir (13), which is filled with coating flowing down from the receptacle (8), thereby coating the end, see e.g. FIG. 2.

Figure 3:
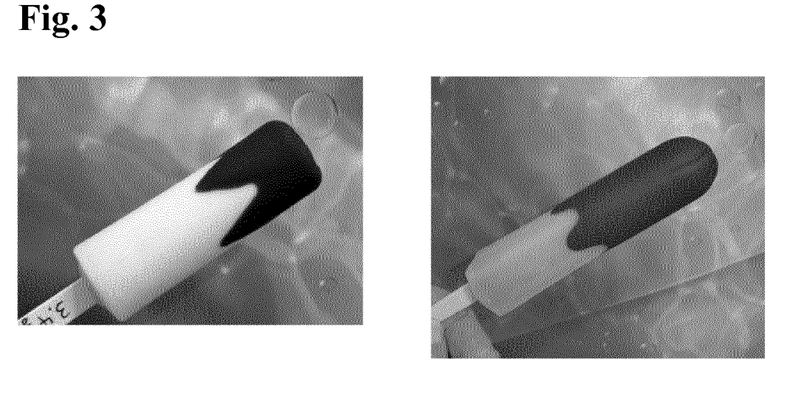
FIG. 3 shows examples of frozen confection with different designs of the borderline between coated and uncoated portions of a cylindrical product

Examples of products partially coated using the procedure subject of this invention are displayed in FIG. 3.

Ice cream bars can be coated by dipping them into a liquid coating material or remain uncoated. Both coated and uncoated products are suitable for application of decorative lines according to the invention.

The apparatus and method according to the invention may be used for decorating all kinds of food product e.g. sweet or savory products. It has been found to be particularly useful for confectionery products. Confectionery products can be confectionery bars, frozen dessert, ice cream, baked product, praline, cake, fondant, water ice, sherbet, wafer cone, ice cream sandwich component, or cookie. The invention has been found to be particular useful for frozen confectionery products and products with a stick.

The method may also include applying a layer of at least one coating material such as chocolate onto the confectionery before the application of partly coating by dipping or enrobing the confectionery with chocolate or by spraying chocolate onto the confectionery and wherein the chocolate is one of milk chocolate, dark chocolate, white chocolate, or combinations thereof, and optionally where the chocolate is partially substituted with a fat other than cocoa fat component. Each foundation layer of chocolate has a thickness between about 0.1 mm to about 2 mm, preferably between about 0.25 mm to about 1.5 mm, and more preferably between about 0.5 mm to about 1 mm. The coating applied before the dipping step subject of this invention, can be a full or partial coating of the product.

In a preferred embodiment of the invention the liquid coating material is fat or water based material. The fat based material can be chocolate. Chocolate may be ordinary chocolate according to accepted regulations or it may be a fat containing confectionery compound material containing sugar, milk derived components, and fat and solids from vegetable or cocoa sources in differing proportions having a moisture content less than about 10 percent, preferably less than about 5 percent by weight. The fat-containing material may be a chocolate substitute containing direct cocoa butter replacements, stearines, coconut oil, palm oil, butter, or any mixture thereof, nut pastes such as peanut butter and fat; praline; confectioner's coatings used for covering cakes usually comprising chocolate analogues with cocoa butter replaced by a non-tempering fat; or a mixture of non-cocoa butter fats, sugar, and milk.

EXAMPLES

By way of example and not limitation, the following examples are illustrative of various embodiments of the present disclosure.

FIG. 3 shows a cylindrical ice lolly with a diameter of 26 mm and a flat end which is partially coated, with the borderline between coated and uncoated portion having a wave form. The coating used is a standard dipping chocolate compound coating as traditionally used for dipping moulded frozen confection products.

A receptacle is used holding 4 application members which protrude out by 4 mm from the receptacle towards the inner void of the receptacle.

The receptacle bears an inlet funnel at the top and is open at the bottom. Beneath the bottom, there is a bottom through. The upper edge of the application members exhibit a triangular shape. Located right above each end of the triangular shape, there is a hole of 4 min in the receptacle. Additionally, there are 2 slits of 11 mm length and 3 mm width on each application member, located right beneath the upper edge, as displayed in FIG. 1c. Each application member holds a vertical spacer member of a width of 2 mm and a thickness of 1 mm, see FIG. 1c. The open gap between the spacer member and the product surface is 1 mm.

Liquid chocolate compound coating is pumped into the housing, resulting in the creation of a layer of coating material on the surface of the application members with a thickness of about 3 mm.

The coating material flows down along the surface of the application members into the bottom trough. The ice lolly is inserted and retracted into the receptacle by half of the length of the ice lolly in a continuous and rapid movement, reflecting a standard dipping operation of a molded stick in industrial operation. During this step, the sides of the product get coated with the chocolate compound material up to the level of insertion. The horizontal end of the product gets coated by being dipped into the bottom trough.

After retraction from the apparatus, the product is partially coated with the borderline between the coated and uncoated portion of the product exhibiting the shape of 4 waves.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An application assembly for applying coating onto confectionary product, the application assembly comprising:
    a housing, the housing comprising:
    a product coating void configured to receive the confectionery product to be coated;
    at least one receptacle, the at least one receptacle configured to receive coating material and comprising one or more supply holes through which the coating material may flow from the housing and into the product coating void;
    each of the at least one receptacle comprises one or more applicator members configured to transfer the coating material onto the confectionery product;
    the one or more applicator members comprise a cavity configured to allow accumulated coating material to be collected and stored when the confectionary product remains static in the product coating void; and
    wherein the one or more applicator members have a protruding edge configured to guide the flow of the coating material and create a borderline between coated and uncoated portions on a surface of the confectionary product, and the protruding edge has a shape that is triangular with concave or convex sides, tilted to a side, rectangular or combinations thereof.

2. The application assembly according to claim 1, further comprising an insert funnel configured to guide the insertion of the confectionary product in the product coating void.

3. The application assembly according to claim 1, comprising a coating reservoir positioned beneath the at least one receptacle configured for coating of an end of the confectionary product inserted into the product coating void.

4. The application assembly according to claim 1, wherein the one or more applicator members are protruding towards the product coating void from an inner surface of the at least one receptacle.

5. The application assembly according to claim 1, wherein the one or more application members have a surface facing towards the product coating void which is oriented parallel to a surface of the confectionary product to be coated when the confectionary product is inserted in the product coating void.

6. The application assembly according to claim 1, wherein the shape of the protruding edge has a shape that is triangular with concave or convex sides.

7. The application assembly according to claim 1, wherein a number of the one or more applicator members in the at least one receptacle is 1 to 10.

8. The application assembly according to claim 1, comprising a plurality of the one or more applicator members which are touching each other.

9. The application assembly according to claim 1, comprising spacer members protruding out from a surface of the one or more applicator members towards a center of the product coating void and having a thickness to bridge a space between the surface of the one or more applicator members and the surface of the confectionary product when the confectionary product is placed in the product coating void, the spacer members are configured to center the confectionary product in the middle of the product coating void.

10. The application assembly according to claim 1, wherein the product coating void and the at least one receptacles comprise a bottom opening through which surplus coating material may flow.

11. An application assembly according to claim 1, comprising a plurality of the one or more applicator members with a gap between each of the one or more applicator members.

* * * * *